(12) United States Patent
Beckett et al.

(10) Patent No.: US 7,017,018 B1
(45) Date of Patent: Mar. 21, 2006

(54) METHOD AND APPARATUS FOR A VIRTUAL MEMORY FILE SYSTEM

(75) Inventors: Peter H. Beckett, Fremont, CA (US); David H. Solina, Oviedo, FL (US)

(73) Assignee: Adaptec, Inc., Milpitas, CA (US)

( * ) Notice: Subject to any disclaimer, the term of this patent is extended or adjusted under 35 U.S.C. 154(b) by 423 days.

(21) Appl. No.: 09/957,097

(22) Filed: Sep. 19, 2001

(51) Int. Cl.
G06F 12/12 (2006.01)

(52) U.S. Cl. .......................... 711/159; 710/62; 711/135; 711/136; 711/114

(58) Field of Classification Search .................... 711/4, 711/104, 113–114, 133–136, 159–160; 710/306, 710/313, 62–64, 74, 310–311; 707/200, 707/1
See application file for complete search history.

(56) References Cited

U.S. PATENT DOCUMENTS

| 5,933,616 A | * | 8/1999 | Pecone et al. .............. 710/240 |
| 6,032,240 A | * | 2/2000 | Brown ........................ 711/173 |
| 6,301,605 B1 | * | 10/2001 | Napolitano et al. ......... 709/201 |
| 6,408,357 B1 | * | 6/2002 | Hanmann et al. ........... 711/113 |

* cited by examiner

*Primary Examiner*—Denise Tran
(74) *Attorney, Agent, or Firm*—Martine Penilla & Gencarella, LLP

(57) ABSTRACT

Methods and a system for a RAM based file system are provided. One exemplary system provides a RAM file system integrated into a host adapter card that connects to a host computer that has access to a storage device. The host adapter card includes a bus interface and a random access memory chip for holding accessed files. The random access memory chip is configured to communicate with the storage device. The accessed files and new files are capable of being operated on until a storage capacity of the random access memory reaches a target level. In response to reaching the target level a file is flushed from the random access memory to the storage device.

15 Claims, 5 Drawing Sheets

METHOD AND APPARATUS FOR A VIRTUAL MEMORY FILE SYSTEM

BACKGROUND OF THE INVENTION

1. Field of the Invention

This invention relates generally to methods and structures for improving system storage of computer systems and more particularly to a system and method for optimizing the storage system architecture as an intelligent random access memory (RAM) based storage system for handling files.

2. Description of the Related Art

Computer systems typically include a processor, main memory and secondary storage memory. The processor is, for example, a Central Processing Unit (CPU) or a microprocessor. The main memory is normally Random Access Memory (RAM), and the secondary storage is typically a hard disk drive.

As today's applications create the need for continuous data availability, memory storage needs have increased proportionately. Developers are producing applications which require increasingly large amounts of memory often exceeding the available RAM. Therefore, heavy demands are placed on the input/output (IO) subsystem that supports pagefiles. For example, high resolution digital image manipulation applications require large amounts of memory.

In addition, many applications make heavy use of temporary files. Due to this heavy use of temporary files, application level performance becomes IO-bound by asynchronous writes to temporary files that are read by the application and then quickly deleted. Often all the reads are satisfied by file cache, however the writes to physical disk can not be stopped by the operating system (OS). This may lead to the situation where multiple gigabytes (GB) of writes to disk exist, yet there are no reads. In this example, all of the writes to physical disk are unnecessary and are a major drag on system performance.

The use of semiconductor memory to support the new generations of high speed CPU's is becoming increasingly expensive. Moreover, very few, if any, workstation motherboards support more than 1 GB of memory.

However, a number of techniques in the prior art attempt to meet the demands of the increased memory requirements without sacrificing speed. RAM disks are one such technology trying to meet the increasing demands. These are virtual disks, usually implemented using system memory. The virtual disks are managed and presented to a user as small disk drives. The drawbacks for RAM disks include the prohibitively expensive costs of system memory and the conflicting demands on the limited amount of RAM in the system.

Another well established technology that is a fundamental component of all major operating systems is virtual memory. With virtual memory, the amount of host memory available to applications is augmented by storage on a disk drive or redundant array of inexpensive disks (RAID) array. However, a substantial performance penalty in terms of speed is sacrificed when information rolled out to disk has to be brought back into RAM.

Yet another technology attempting to address the demands for increased memory is that of caching data within an IO storage subsystem. However, the caching of data does nothing to address the primary issues with temporary files mentioned above. In addition the caching of data does very little to address pagefile activity since pagefile writes are synchronous writes, i.e., the IO subsystem is instructed not to cache them. Furthermore, the content of the block level cache is flushed out to the disk when the disk subsystem is not very busy, thus creating unnecessary disk activity.

As a result, there is a need to solve the problems of the prior art to provide a low cost solution to the increased demand being placed on system memory while simultaneously increasing system performance through the intelligent deletion of temporary files.

SUMMARY OF THE INVENTION

Broadly speaking, the present invention fills these needs by providing a method and system for a storage architecture front ended by an extensible RAM file system. It should be appreciated that the present invention can be implemented in numerous ways, including as a process, an apparatus, a system, or a device. Several inventive embodiments of the present invention are described below.

In one embodiment, a RAM file system integrated into a host adapter card connected to a host computer that has access to a storage device is provided. In this embodiment, the host adapter card includes a bus interface and a random access memory chip for holding accessed files. The random access memory chip is configured to communicate with the storage device. The accessed files and new files are capable of being operated on until a storage capacity of the random access memory reaches a target level, where in response to reaching the target level a file is flushed from the random access memory to the storage device.

In another embodiment, a RAM file system integrated into a host adapter card connected to a host computer that has access to a storage device is provided. In this embodiment the host adapter card includes a bus interface, a RAID input/output processor (IOP) and a random access memory chip for holding accessed files. The RAID IOP manages temporary storage of the accessed files. The random access memory chip is configured to communicate with the storage device and the accessed files and new files are capable of being operated on until a storage capacity of the random access memory reaches a target level. In response to reaching the target level, one least frequently used file is flushed from the random access memory to the storage device.

In yet another method for handling disk IO using a mountable RAM file system is provided. In this embodiment, the method accesses selected files from a storage system and creates temporary files for each of the selected files where the temporary files are stored in the memory of the RAM file system. Then, the temporary files are operated on and the operations continue until a storage capacity of the RAM file system reaches a target level. In response to reaching a target level, files stored in the RAM file system that have not been recently used are flushed to the storage system so that capacity in the RAM file system is liberated for additional files.

In still another embodiment, a method for implementing a mountable RAM file system outside of a host CPU is provided. In this embodiment files stored on a disk are provided with the disk being configured to communicate with the RAM file system. Next, the method accesses selected files from the RAM file system from the disk and then creates temporary files for each of the selected files. Then, the temporary files are operated on. Next, the temporary files are saved in the RAM file system without writing down the temporary files to disk. Finally, a set of temporary files are flushed to disk when a critical level for a storage capacity of the RAM file system is obtained.

In still yet another embodiment, a method for managing stored files is provided. In this embodiment, the method accesses files from a storage system and creates temporary files for each of the selected files where the temporary files are stored in a memory of a RAM file system. Next, the temporary files are operated on and the operations on the temporary files continue until a shutdown signal is received. Then, in response to the shutdown signal the operated-on temporary files are flushed to the storage system.

In another embodiment, an apparatus for managing a file system of a host computer is provided. The apparatus includes a central processing unit (CPU), a random access memory (RAM) unit and a communication chip. A bus connecting the CPU, the RAM and the communication chip is included. A storage media and a RAM file system is included where the RAM file system is configured to communicate with the storage media through the communication chip. The RAM file system is further configured to store temporary files where the temporary files are capable of being operated on until a storage capacity of the RAM file system reaches a target level. At the target level the RAM file system is configured to flush not recently used files to the storage media.

The advantages of the present invention are numerous. Most notably, by moving memory outside the host space on a plug in board or an external storage device connected by a high speed link, the response time for requests to access files is improved. Elimination of the time based flushes to disk preclude unnecessary disk activity thereby improving system performance. Additionally, in one embodiment, by closely coupling the RAM file system with a RAID subsystem the memory of the RAM file system can appear much larger than it actually is through the use of virtual memory techniques. Correspondingly, the RAID subsystem gains the knowledge of load profiles through communication with the RAM file system. Moreover, dissociating the file system from the operating system allows for the operating system to perform other functionality in a more timely and efficient manner.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system and method for a RAM file system implemented using virtual memory techniques. It will be obvious, however, to one skilled in the art, that the present invention may be practiced without some or all of these specific details. In other instances, well known process operations have not been described in detail in order not to unnecessarily obscure the present invention.

The embodiments of the present invention provide a system and method for a mountable RAM file system. The RAM file system of the present invention increases the speed at which a user can access data having a transitory meaning. As will be explained in more detail below, the technique of incorporating time based flushes to disk at times of low activity is not performed with the RAM file system as is common with virtual memory, RAID controllers and caching algorithms.

The implementation of the present invention and its various embodiments are achieved through host based software which monitors file usage of a computer system. The software code is coupled with random access memory (RAM) tailored to store files based on usage. In accordance with one embodiment of the invention, the code is executed by the system processor and will monitor accessed files. As will be explained in more detail below, the system processor may be a central processing unit of the host computer or an IO processor (IOP) of a RAID chip. In accordance with one embodiment of the invention, the code contains a driver to identify an adapter card or plug-in board containing the RAM memory of the RAM file system.

The code of the RAM file system provides the functionality to monitor the usage of files. In accordance with one embodiment of the invention, accessed files are copied into RAM outside of host space on a plug in board, hence the RAM file system contains a working set of the user's files. It should be appreciated that the RAM file system i.e., the code and the associated RAM eliminates the need for time based flushing of files to disk. Because the RAM file system stores the files separate from the system RAM utilized by the operating system, it is only necessary to flush the least frequently used files to disk when the memory of the RAM file system approaches its capacity, or the system is about to shut down.

Discussed below are various hardware illustrations for implementing the code and the RAM making up the RAM file system. It should be appreciated that the hardware implementations are provided for illustration purposes only and are not meant to limit the invention.

Figure 1:
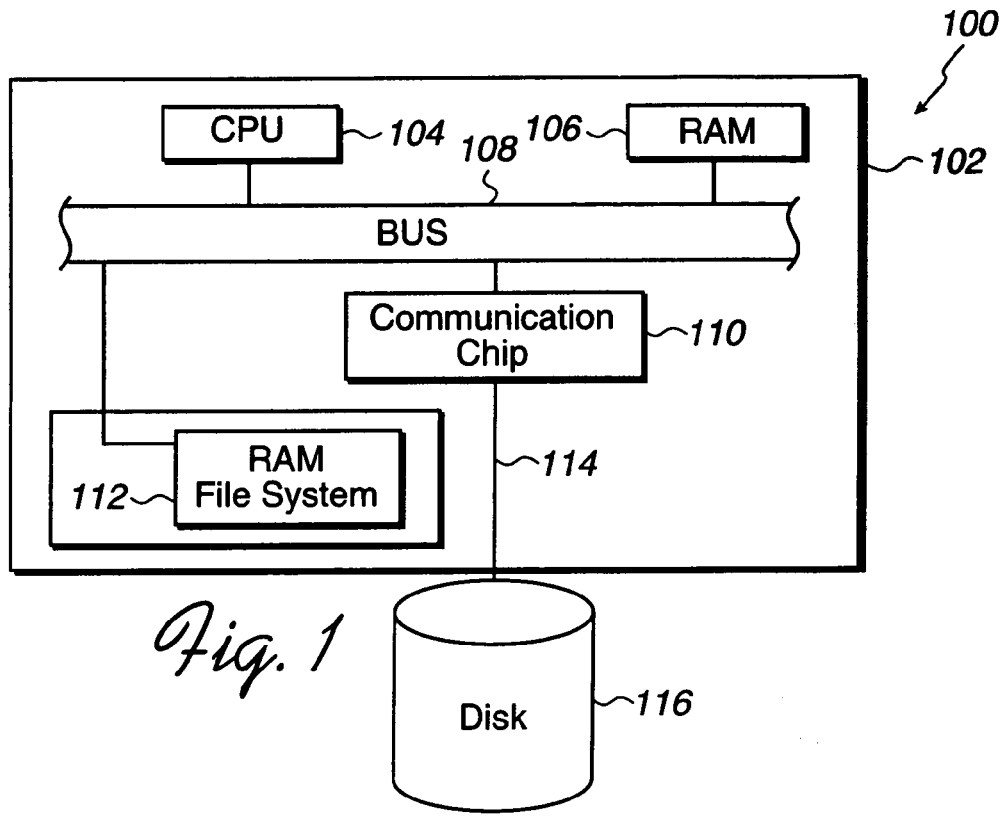
FIG. 1 illustrates a block diagram defining a RAM file system in accordance with one embodiment of the invention.

FIG. 1 illustrates block diagram 100 defining a RAM file system in accordance with one embodiment of the invention. Block diagram 100 displays a motherboard 102 of a personal computer. Attached to motherboard 102 are the central processing unit (CPU) 104 and random access memory (RAM) 106. The RAM 106 may be a memory stick containing DRAM memory chips and the like. The CPU 104 and the RAM 106 are connected to a bus 108. For example, the bus may be an industry standard architecture (ISA) bus, and extended industry standard architecture (EISA) bus, a peripheral component interconnect (PCI) bus, PCIx, etc. Connected to bus 108 is a communication chip 110. The communication chip 110 may be a small computer system interface (SCSI) chip, integrated drive electronics (IDE) chip, enhanced integrated drive electronics (EIDE) chip, AT attachment (ATA)/IDE chip, serial ATA (SATA) chip, FIREWIRE™ 1394 chip, Infiniband, etc. A RAM file system 112 is connected to the bus 108. In accordance with one embodiment of the invention, the RAM file system 112 is simply a RAM chip on a plug-in board or an adapter card. Code (not shown) executed by the CPU 104 monitors file usage and copies files to the RAM file system 112.

Continuing with diagram 1, a storage disk 116 is connected to the communication chip 110. In accordance with one embodiment of the invention the disk 116 is connected to the communication chip 110 through a bus 114. The bus 114 may be a SCSI bus, an IDE bus, or the like. In accordance with another embodiment of the invention, the disk 116 may be a redundant array of inexpensive disks (RAID) subsystem as will be explained in more detail in reference to FIG. 4.

The RAM file system of FIG. 1 maintains a working set of a user's files in accordance with one embodiment of the invention. As will be explained in more detail below, the RAM file system has the intelligence to associate block addresses with file activity through the knowledge of the file system. In other words, the RAM file system abstracts caching in the CPU to the RAM file system controller. As such, different physical memory is used by the RAM file system to isolate IO from the drive to alleviate management of the file system from the operating system. It can be appreciated that since the RAM file system is managed through its own code and not the operating system (OS), application performance is improved since the bottleneck of managing disk activity is offloaded to the RAM file system. In addition, the unnecessary disk activity caused when the OS writes file activity to the physical disk is minimized through the utilization of the RAM of the RAM file system. Furthermore, as will be explained in more detail in reference to FIG. 6, the unnecessary writes performed when the OS manages the file system become in-memory operations with no rotating disk activity using the RAM file system. The in-memory operations are performed much quicker, thereby enhancing system performance.

Figure 2:
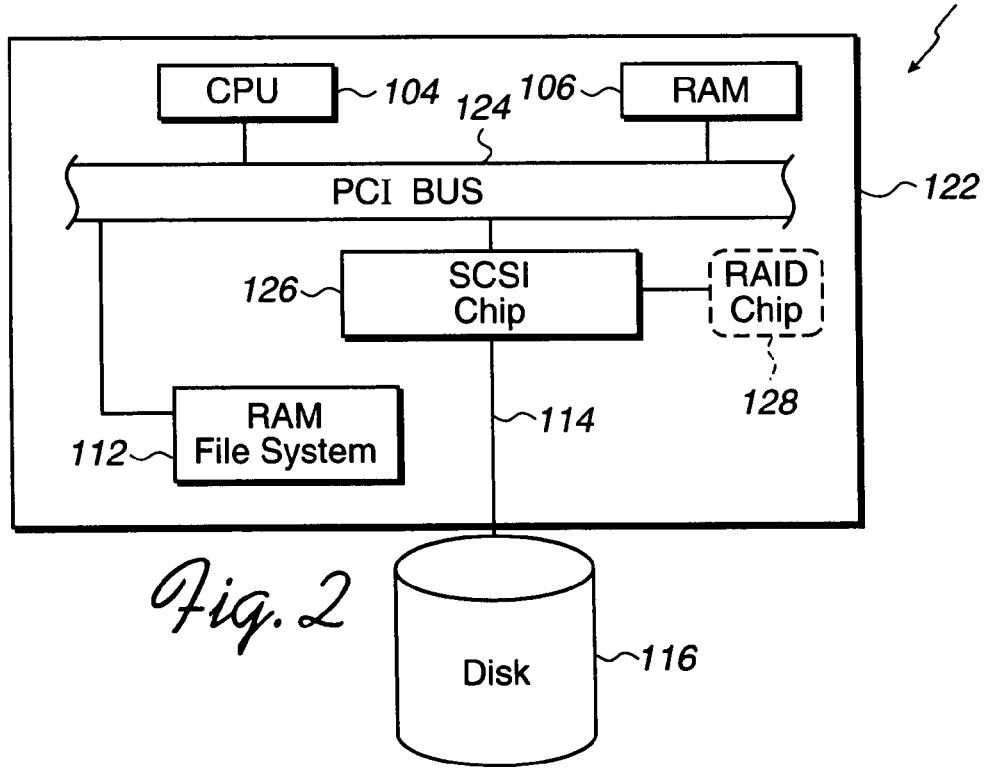
FIG. 2 illustrates a block diagram defining another hardware implementation of a RAM file system in accordance with one embodiment of the present invention.

FIG. 2 illustrates block diagram 120 defining another hardware implementation of a RAM file system in accordance with one embodiment of the present invention. Block diagram 120 is similar to block diagram 100 of FIG. 1 with the following exceptions. The CPU 104 and the RAM 106 are connected to a PCI bus 124. Connected to PCI bus 124 is a SCSI chip 126. The SCSI chip 126 allows for communication with peripheral devices, such as disk 116. The RAM file system 112 is shown in communication with the PCI bus 124 and the SCSI chip 126. In accordance with one embodiment of the invention, the RAM file system may be a plug-in board containing semiconductor memory and associated logic. The disk 116 is connected to the SCSI chip 126 through a SCSI bus 114.

Continuing with FIG. 2, a RAID chip 128 is in communication with the SCSI chip 126. The RAID chip controls a RAID subsystem for supporting the virtual memory needs of the RAM file system 112. It can be appreciated that through the use of virtual memory the size of the memory of the RAM file system 112 can be presented as being larger than the physical memory of the RAM file system 112. In accordance with one embodiment of the invention, the code which monitors the usage of the file activity for the RAM file system may be contained within the IOP of the raid chip 128.

Figure 3:
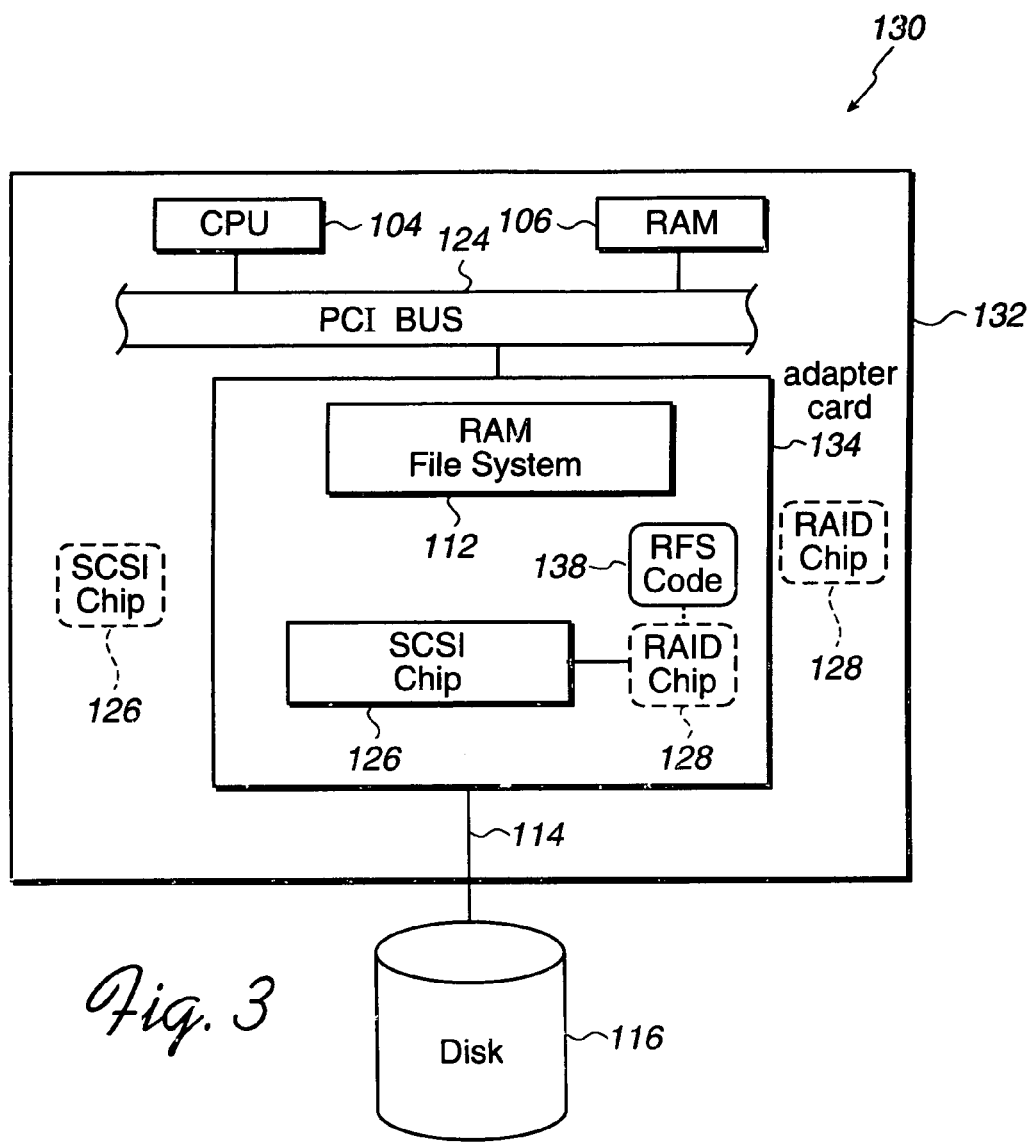
FIG. 3 illustrates a block diagram defining a third hardware implementation of a RAM file system in accordance with one embodiment of the present invention.

FIG. 3 illustrates block diagram 130 defining yet another hardware implementation of a RAM file system in accordance with one embodiment of the present invention. Block diagram 130 is similar to block diagram 120 of FIG. 2 with the following exceptions. An adapter card 134 housing a SCSI chip 126 is connected to the PCI bus 124. The RAM file system 112 can thus communicate with the CPU 104 through PCI bus 124. The disk 116 is connected to the adapter card 134. In accordance with one embodiment of the invention, the disk 116 may be connected to the SCSI chip 126 through a SCSI bus or over a network. In accordance with another embodiment of the invention, the disk 116 may be a redundant array of inexpensive disks (RAID) subsystem as will be illustrated in reference to FIG. 4.

Continuing with FIG. 3, a RAID chip 128 is in communication with the SCSI chip 126. The RAID chip controls a RAID subsystem for supporting the virtual memory needs of the RAM file system 112. In accordance with one embodiment of the invention, the RAM file system 112, SCSI chip 126 and RAID chip 128 reside on an adapter card 134. In this embodiment, the adapter card may be configured to connect into the motherboard 132 via a PCI slot, ISA connection, EISA connection, or the like, on the motherboard 132. In accordance with another embodiment of the invention the RAID chip 128 and the SCSI chip 126 may reside on the motherboard 132. In this alternative embodiment, the adapter card housing the RAM file system 112 will connect into the motherboard 132 through a PCI slot on the motherboard 132 which will establish a connection to the RAID chip 128 and the SCSI chip 126 on the motherboard 132. It can be appreciated that the SCSI chip and the RAID chip may both be located on the motherboard 132 or the adapter card 134. Alternatively, one of the chips may be located on the motherboard 132 and the other chip on the adapter card 134.

The RAID chip 128, of FIG. 3, has its own IO processor, in accordance with one embodiment of the invention. With this embodiment, the RAM file system (RFS) code 138 utilizes the IO processor of the RAID chip 128. In accordance with one embodiment of the invention, the RFS code 138 is contained on an electrically erasable programmable read only memory (EEPROM) chip. Accordingly, the RAM 112 is managed by the RFS code 138, each being located on adapter card 134, in order for the RAM file system and the associated code to be packaged as a stand-alone unit.

Figure 4:
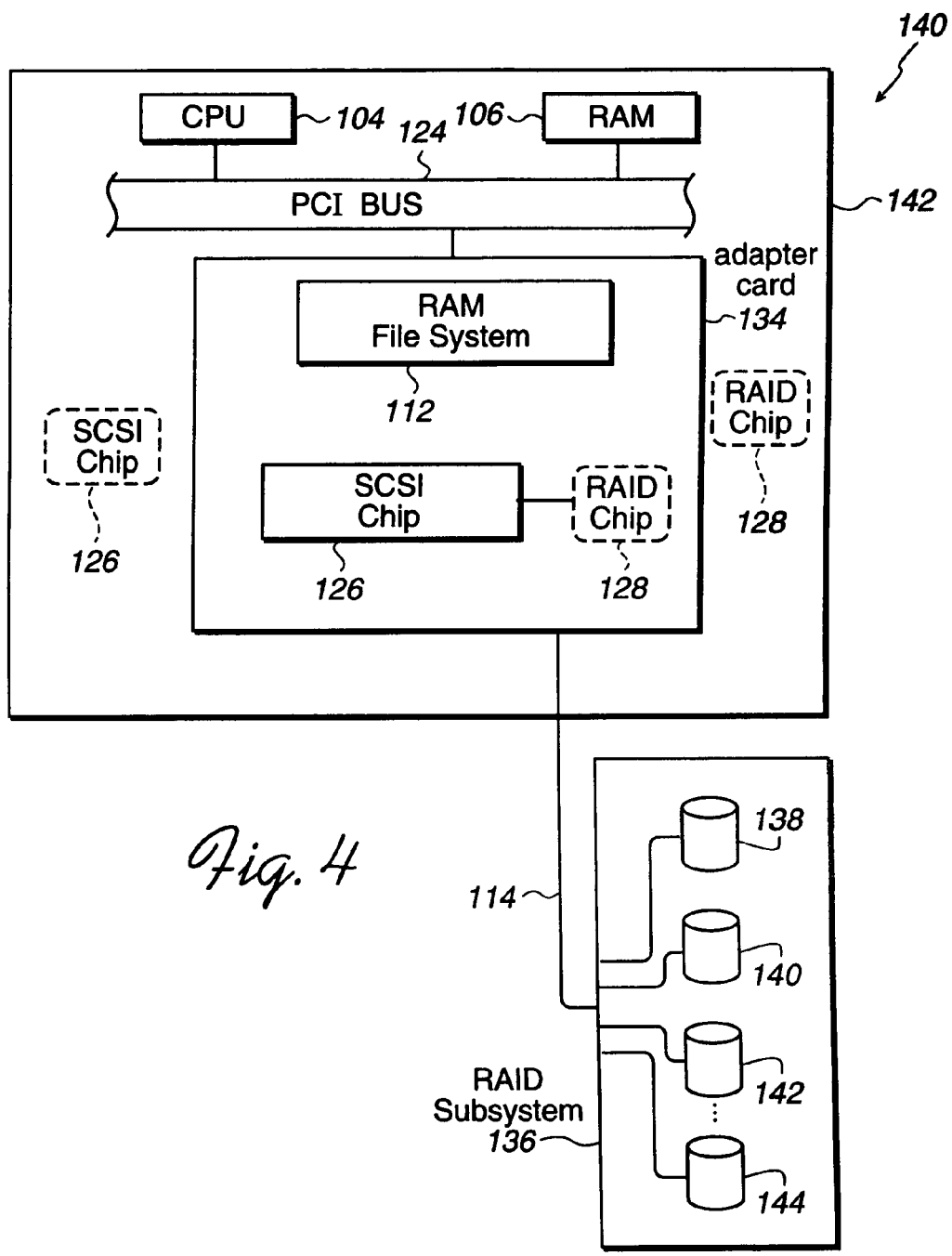
FIG. 4 illustrates a block diagram defining a fourth hardware implementation of a RAM file system in accordance with one embodiment of the present invention.

FIG. 4 illustrates block diagram 140 defining still another RAM file system in accordance with one embodiment of the present invention. Block diagram 140 is similar to block diagram 130 with the following exceptions. A RAID subsystem 136 is connected to the adapter card 134 through a SCSI bus 114. The RAID subsystem may contain a plurality of disks, such as hard drive one (HD1) 138, HD2 140, HD3 142 and HDn 144. If the RAID subsystem 136 or storage is not locally attached via a SCSI connection, the RAM file system 112 can also access storage by way of a network connection. Preferably, the network connection will be a high speed link, such as Gigabit Ethernet, 10 gigabit Ethernet, Infiniband, etc.

Continuing with FIG. 4, a RAID chip 128 is in communication with the SCSI chip 126. The RAID chip will control a RAID subsystem for supporting the virtual memory needs of the RAM file system 112. In accordance with one embodiment of the invention, the RAM file system, SCSI chip 126 and RAID chip 128 may reside on an adapter card 134. In accordance with another embodiment of the invention the RAID chip 128 and/or the SCSI chip 126 may reside on the motherboard 142. It can be appreciated that the RAID subsystem may incorporate any of the common RAID techniques such as disk mirroring, disk striping, bit by bit parity, etc. In accordance with one embodiment of the invention, the RFS code is contained on an EEPROM chip and utilizes the IOP of the RAID chip.

Figure 5:
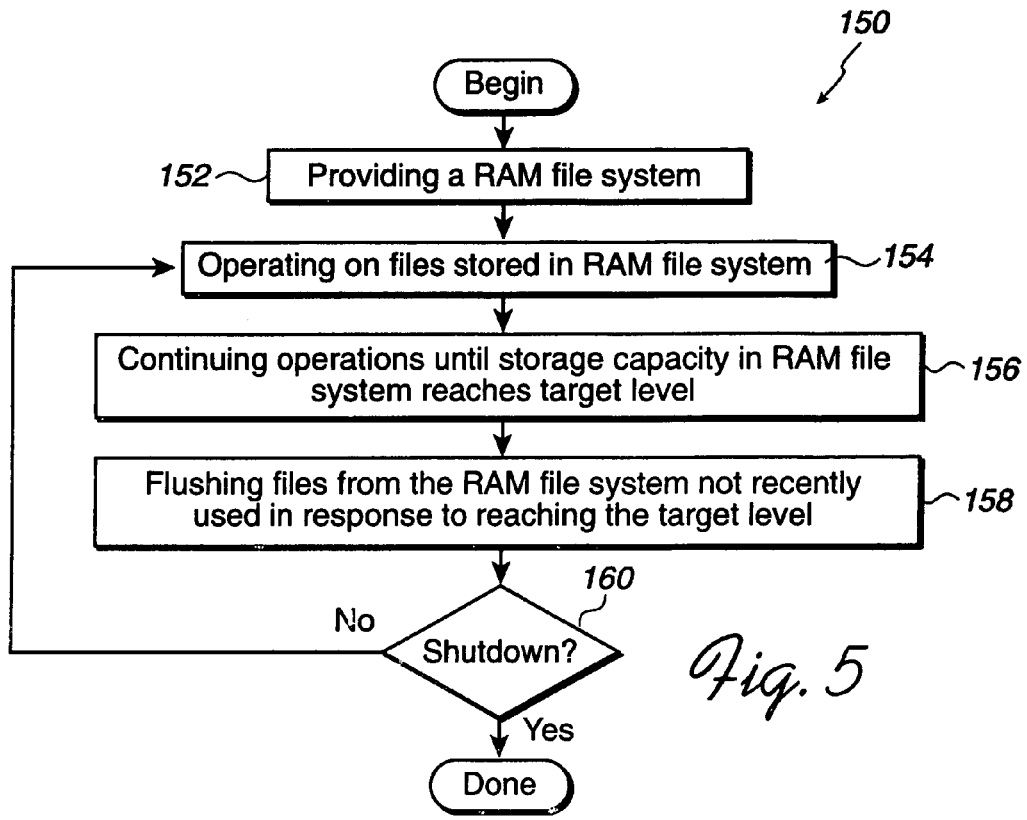
FIG. 5 illustrates a flowchart depicting a method for implementing a RAM file system in accordance with one embodiment of the invention.

FIG. 5 illustrates a flowchart 150 depicting a method for implementing a RAM file system in accordance with one embodiment of the invention. Flowchart 150 initializes with operation 152 where a RAM file system is provided. In accordance with one embodiment of the invention, the RAM file system stores a working set of users files. The RAM file system, as mentioned above, can be in the form of a plug-in board. Code for managing the working set of user files is executed by the system processor to ensure that the working set of user files are only rolled out to disk when additional memory space is needed or the computer is shut down.

Flowchart 150 then proceeds to operation 154 where the working set of files stored in the RAM file system are operated on. For example, referring to FIG. 4, files may be accessed from the RAID subsystem 136 and written to the RAM file system 112 for a user to operate on the accessed file. Operation 154 will be explained in more detail in reference to FIGS. 6 and 7. Next, the method proceeds to operation 156 where the user continues to operate on the current set of files and those files opened in operation 154 until the storage capacity of the RAM file system reaches a target level. In accordance with one embodiment of the invention, the target level is a critical point indicating that additional memory capacity in the RAM file system needs to be made available for more files or file manipulation.

Accordingly, once the target level is reached in operation 156 of FIG. 5, the method proceeds with operation 158 where files from the RAM file system not recently used are flushed to disk. Flushing the files to disk liberates capacity in the memory of the RAM file system so that additional files may be accessed and operated on. In accordance with one embodiment of the invention, the files may be rolled out to a RAID subsystem as described in reference to FIG. 4. It is known in the art that the current write throughput rates for controllers writing to disk in RAID technology are approximately 100 megabytes per second. However, the memory transfer rate for the direct attached memory of the RAM file system with a 66 megahertz 64 bit wide PCI slot is approximately five times faster, i.e., 500 megabytes per second. Use of PCIx technology will increase the transfer rate further. Accordingly, the increased throughput allows the operating system to page out information and perform other functions in a more efficient manner. As mentioned previously, the RAID subsystem may be finely tuned to support the virtual memory needs of the RAM file system. The RAM file system with a RAID subsystem becomes more than memory used as a block level cache, since the RAM file system has actual knowledge of the file activity. It can be appreciated that a RAID system without the RAM file system is limited because of its lack of intelligence of anything other than block addresses of the files. Therefore, the RAM file system combined with the RAID subsystem creates a synergistic union where the intelligence of the file activity is gained. As mentioned above, the code for managing the RAM file system may be executed by the IOP of a RAID chip.

FIG. 5 terminates with operation 160 where the system will shutdown or the user will operate on the file in the RAM file system. If a user returns to operating on the files then operations 154, 156 and 158 of flowchart 150 may be repeated any number of times while a user is operating on the files. Additionally, it is understood that the files are flushed to disk upon the initiation of a system shutdown signal, as the memory on the RAM file system is volatile. Accordingly, a system shutdown signal during any of operations 154–158 will cause the RAM file system to roll out the files to a storage media such as a disk, hard drive, RAID subsystem, etc. Since the RFS code of the RAM file system has knowledge of block addresses as well as the file system activity, the RAM file system may be configured to update the most recent version of a modified document or file on the storage media. It can be appreciated that the time based flushes during period of low disk activity performed under virtual memory techniques are not required as the RFS code for managing the RAM file system monitors the memory capacity. As such, the RAM file system only flushes to disk upon the storage capacity reaching a target level or upon the initiation of a shutdown sequence.

Figure 6:
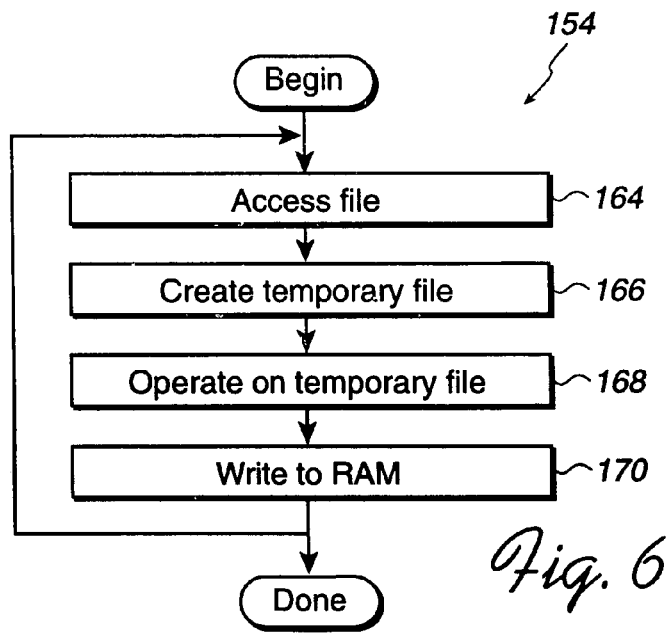
FIG. 6 illustrates a flowchart depicting a more detailed description of operating on files stored in a RAM file system in accordance with one embodiment of the invention.

FIG. 6 illustrates flowchart 154 depicting a more detailed description of operation 154 of FIG. 5, where files stored in a RAM file system are operated on, in accordance with one embodiment of the invention. FIG. 6 initializes with operation 164 where a file is accessed and opened. For example, the file may be accessed from storage media such as a storage disk or a RAID subsystem. It can be appreciated that the file may be any file capable of being stored such as a word processing document, a multimedia file, a graphics file, etc. Once the file is accessed, the method proceeds to operation 166 where a temporary file is created. In accordance with one embodiment of the invention, the temporary file is written to the RAM file system. Next, the method proceeds to operation 168 where the temporary files are operated on. For example, a user may make some modifications to the temporary file such as editing a WORD™ document or modifying a complex graphics file. Flowchart 162 terminates with operation 170 where the modified temporary file is written to the semiconductor memory of the RAM file system. It can be appreciated that writing the temporary file to the semiconductor memory of the RAM file system is much quicker than writing to disk. As described in reference to FIG. 5, the operations 164–170 may be repeated multiple times for multiple files until a target level of storage capacity defining a critical point is reached. In response to reaching the target level, the RAM file system will flush files not recently used to disk in order to free up capacity to continue operating on files in storage.

Figure 7:
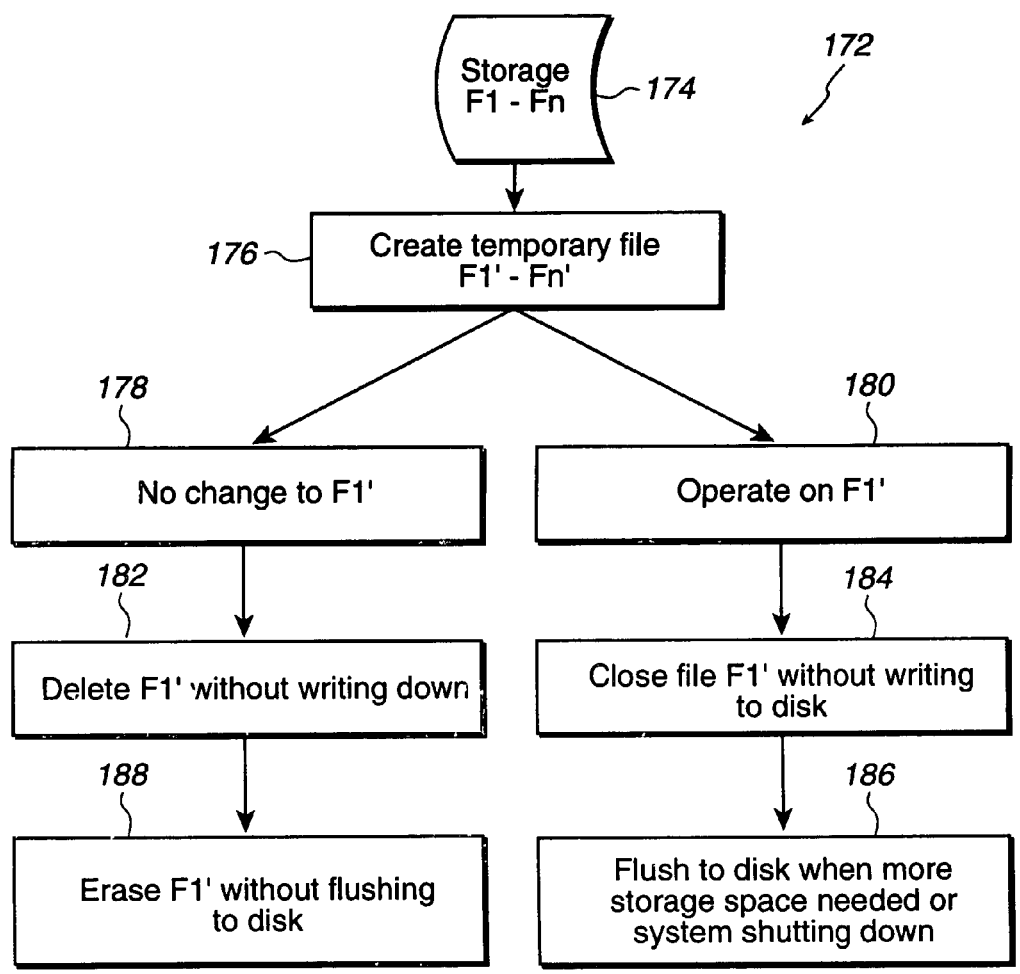
FIG. 7 illustrates a block diagram depicting the creation of temporary files in a RAM file system in accordance with one embodiment of the invention.

FIG. 7 illustrates block diagram 172 depicting the creation of temporary files in the RAM file system in accordance with one embodiment of the invention. FIG. 7 illustrates files F1–Fn stored on storage media 174. Storage media 174 may be a hard drive or a RAID subsystem. A user may wish to modify file F1 and a temporary file, F1', 176 will be written to the RAM file system. For illustration purposes two possibilities are shown next. If the user decides not to make any changes or modifications 178 to the temporary document F1', then the RFS code of the RAM file system contains the intelligence to close file F1' without writing the file to disk. In accordance with one embodiment of the invention, the RAM file system stores a copy of file F1' in the memory of the RAM file system in case the user decides to re-open the file for modifications. When the RAM file system flushes files to disk in response to a critical level being reached or a shutdown signal, the unmodified temporary file (F1') is erased 188. However, if a temporary file was modified (F1'), then upon the flushing of the files by the RAM file system, the modified temporary files will replace the original file (F1) in storage.

Proceeding with the alternative path of block diagram 172, should a user decide to modify or operate on file F1' 180, then once the user has completed modifications or operating on file F1' the RAM file system will close file F1' without writing to disk 184. It can be appreciated that the user may elect to operate on more than one file from the associated storage system of the RAM file system. For example, files F2–Fn may be stored on a storage medium and a user may choose to decide to operate on any of the stored files. Temporary files F2–Fn' will be opened for each of the user chosen files and written to the RAM file system. As these operations continue the storage capacity of the RAM file system will reach a critical or target level. In response to reaching this critical level, the RAM file system will flush to disk 186 files not recently used in order to free up storage capacity as discussed above. In addition, the RAM file system will also flush files to disk in response to a shutdown signal in accordance with on embodiment of the invention. As explained above in reference to FIG. 7, the files are updated and closed but not deleted by the RAM file system. This lazy file deletion aspect of the RAM file system, where files are not flushed or deleted upon being closed allows for more efficient processing by minimizing disk activity.

The RAM file system and the various embodiments described above may be accessed through a network connection. For example, in one embodiment of the invention, a host computer with access to a network interface card (NIC), may connect to a network and communicate with the RAM file system as embodied in FIGS. 1–4. The network may be a local area network (LAN), a wide area network (WAN), etc. The network may utilize a high speed communication link such as Ethernet, Infiniband, and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A host adapter card that connects to a host computer that has access to a storage device, the host adapter card including,
   a bus interface;
   a random access memory (RAM) file system, wherein the RAM file system includes,
      a RAM file system code, which is separate from an operating system, the RAM file system code is configured to monitor file usage for the RAM file system and copy accessed files to the RAM file system; and
      a random access memory (RAM) dedicated to the RAM file system for holding accessed files, the accessed files and new files capable of being operated on until a storage capacity of the RAM reaches a target level, and in response to reaching the target level, a file from the random access memory is flushed to the storage device, wherein the RAM file system code is executed on the host computer to manage the files of the RAM file system.

2. The host adapter card as recited in claim 1, wherein the storage device is a hard drive.

3. The host adapter card as recited in claim 1, wherein the storage device is a RAID.

4. The host adapter card as recited in claim 1, wherein the bus interface is a PCI bus interface.

5. The host adapter card as recited in claim 1, wherein the flushing is not time based flushing.

6. A host adapter card that connects to a host computer that has access to a storage device, the host adapter card including,
   a bus interface;
   a RAID input/output processor (IOP);
   a RAM file system, wherein the RAM file system including,
      a RAM file system code, which is separate from an operating system, the RAM file system code is configured to monitor file usage for the RAM file system and copy accessed files to the RAM file system; and
      a random access memory chip, having a random access memory (RAM) that is dedicated to the RAM file system, and for holding accessed files, the RAID IOP managing temporary storage of the accessed files, the random access memory chip being configured to communicate with the storage device, wherein the accessed files and new files are operated on, until a storage capacity of the random access memory chip reaches a target level, thereby causing one least frequently used file to be flushed from the random access memory to the storage, wherein the RAM file system code is executed on the host computer to manage the files of the RAM file system.

7. The host adapter card as recited in claim 6, wherein the storage device is RAID storage.

8. The host adapter card as recited in claim 6, wherein the flushing is not time based flushing.

9. The host adapter card as recited in claim 6, wherein the bus interface is a PCI interface.

10. The host adapter card as recited in claim 6, wherein a RAM file system code is executed on the RAID IOP for managing temporary storage of the accessed files.

11. An apparatus for managing a file system of a host computer, comprising:

a central processing unit (CPU) is located on the host computer;

a random access memory (RAM) unit, having a random access memory (RAM) that is separate from a system RAM utilized by an operating system;

a communication chip;

a bus connecting the CPU the RAM and the communication chip;

a storage media; and a RAM file system, which is being managed by a RAM file system code that is different from the operating system, the RAM file system is configured to communicate with the storage media through the communication chip, the RAM file system further being configured to store temporary files, the temporary files capable of being operated on until a storage capacity of the RAM file system reaches a target level wherein the RAM file system in response to reaching the target level being configured to flush not recently used files to the storage media, wherein the RAM file system code is executed through the CPU to manage the files of the RAM file system.

12. The apparatus as recited in claim 11, wherein the RAM file system is contained on an adapter card.

13. The apparatus as recited in claim 12, wherein the adapter card contains one of a SCSI chip and a RAID chip.

14. The apparatus as recited in claim 11, wherein the storage media is a plurality of disks.

15. The apparatus as recited in claim 11, wherein the storage media is a RAID subsystem.

* * * * *